(12) United States Patent
Cung (10) Patent No.: US 10,944,626 B2
(45) Date of Patent: Mar. 9, 2021

(54) ENTERPRISE MOBILITY MANAGEMENT (EMM) INTERMEDIARY APPLICATION

(71) Applicant: Box, Inc., Redwood City, CA (US)

(72) Inventor: Don Cung, Atherton, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 16/263,209

(22) Filed: Jan. 31, 2019

(65) Prior Publication Data

US 2020/0252270 A1 Aug. 6, 2020

(51) Int. Cl.
*H04L 12/24* (2006.01)
*G06F 21/53* (2013.01)
*H04L 29/06* (2006.01)

(52) U.S. Cl.
CPC .......... *H04L 41/0806* (2013.01); *G06F 21/53* (2013.01); *H04L 41/0893* (2013.01); *H04L 63/101* (2013.01)

(58) Field of Classification Search
CPC .... H04L 63/0815; H04L 67/34; H04W 12/06; H04W 12/0609; H04W 12/08; G06F 21/41; G06F 21/44; H04N 21/42203; H04N 21/4722; H04N 21/8133; H04N 21/8456
See application file for complete search history.

(56) References Cited

U.S. PATENT DOCUMENTS

| | | | | |
|---|---|---|---|---|
| 9,602,514 | B2 * | 3/2017 | Narayanan | H04L 43/08 |
| 10,404,684 | B1 * | 9/2019 | Chittireddy | H04W 8/20 |
| 2017/0094509 | A1 * | 3/2017 | Mistry | H04W 12/0608 |
| 2018/0159856 | A1 * | 6/2018 | Gujarathi | H04L 63/10 |

* cited by examiner

*Primary Examiner* — Chirag R Patel
(74) *Attorney, Agent, or Firm* — Sheridan Ross P.C.

(57) ABSTRACT

Embodiments of the disclosure provide systems and methods for accessing an Enterprise Mobility Management (EMM) application. According to one embodiment, a method for utilizing Enterprise Mobility Management (EMM) services can comprise receiving, at an EMM enabler application executing on an EMM system, a request for EMM information from a client application during a log in processes or the EMM system by the client application. The EMM enabler application can comprise an intermediary between the client application and the EMM system and the EMM enabler application can support a plurality of different EMM systems. The EMM enabler application can make an EMM-specific request for configuration information to the EMM system, receive the requested configuration information from the EMM system in response to the request, and provide, to the client application in response to the received request, the received configuration information from the EMM system.

20 Claims, 5 Drawing Sheets

ENTERPRISE MOBILITY MANAGEMENT (EMM) INTERMEDIARY APPLICATION

FIELD OF THE DISCLOSURE

Embodiments of the present disclosure relate generally to methods and systems for accessing an Enterprise Mobility Management (EMM) service and more particularly to an intermediary application between a client device and the EMM service.

BACKGROUND

An Enterprise Mobility Management (EMM) service provides functions allowing an enterprise or other organization to support secure mobile communications. For example, an enterprise can use an EMM service to support secure access to email and other enterprise information technology assets by employees or other authorized persons through their mobile devices. Currently, there are a number of EMM service providers. To use these services, an enterprise can register applications with the EMM service. Once registered, these applications can be made available to the end users at login to the EMM service and use of these applications can be secured by the EMM service.

However, each EMM service uses a different, unique interface. This can present challenges to software vendors of mobile applications and the enterprises using the EMM services to secure the use of those applications. For example, the vendor of the mobile application would need to develop different versions of the application to make it available for use with each of the different EMM services. Then, when updates are made to those mobile applications, the updated application would need to be tested against each different EMM service. Additionally, the system administrators of the enterprise would need to re-register or upload each new update with the EMM service and then push those updates to the users. As a result, software vendors are faced with increasing maintenance overhead for each EMM supported and the administrators of the enterprises are reluctant to perform updates because of the burdens they present. Hence, there is a need for improved methods and systems for improved methods and systems for accessing an EMM system.

BRIEF SUMMARY

Embodiments of the disclosure provide systems and methods for accessing an Enterprise Mobility Management (EMM) application. According to one embodiment, a method for utilizing Enterprise Mobility Management (EMM) services can comprise receiving, at an EMM enabler application executing on an EMM system, a request for EMM information from a client application during a log in processes or the EMM system by the client application. The EMM enabler application can comprise an intermediary between the client application and the EMM system and the EMM enabler application can support a plurality of different EMM systems. The EMM enabler application can make an EMM-specific request for configuration information to the EMM system, receive the requested configuration information from the EMM system in response to the request, and provide, to the client application in response to the received request, the received configuration information from the EMM system.

The configuration information provided by the EMM enabler to the client can comprise login information for a service corresponding to the client application. Furthermore, the request from the client application to the EMM enabler and the response provided from the EMM enabler application to the client application can be specific to the EMM enabler application and client application and not the EMM system. Making the EMM-specific requests for configuration information to the EMM system can comprise broadcasting the request to the EMM system, making an Application Program Interface (API) call to the EMM system, or issuing a query to the EMM system depending upon which EMM system of the plurality of EMM systems the request is made. Accordingly, receiving the requested configuration information from the EMM system can comprise receiving a broadcast from the EMM system, receiving an API response, or receiving a query response depending upon which EMM system of the plurality of EMM systems the request is made.

In some cases, the EMM enabler application can maintain the received configuration information. In such cases, the EMM enabler application can receive a subsequent request for EMM information from a client application during a log in processes or the EMM system by the client application and respond to the subsequent request using the configuration data maintained by the EMM enabler application. Additionally, or alternatively, the EMM enabler application can provide one or more functions of a service corresponding to the client application.

According to another embodiment, a method for utilizing EMM services can comprise requesting, by a client application executing on a client device, EMM information from an EMM enabler application during a log in processes or the EMM system by the client application. The EMM enabler application can comprise an intermediary between the client application and the EMM system and the EMM enabler application can support a plurality of different EMM systems. The request from the client application to the EMM enabler can be specific to the EMM enabler application and client application and not the EMM system.

The client application can receive the requested configuration information from the EMM enabler application in response to the request. The response provided from the EMM enabler application to the client application can be specific to the EMM enabler application and client application and not the EMM system. The configuration information provided by the EMM enabler to the client can comprise login information for a service corresponding to the client application. The client application can access the service corresponding to the client application using the received configuration information from the EMM enabler application.

According to yet another embodiment, a system can comprise a client device comprising a processor and a memory coupled with and readable by the processor and storing therein a set of instructions which, when executed by the processor, can cause the processor to request Enterprise Mobility Manager (EMM) information during a log in processes or the EMM system by the client application. A server can comprise a processor and a memory coupled with and readable by the processor and storing therein a set of instructions which, when executed by the processor, causes the processor to execute an EMM enabler application, wherein the EMM enabler application can receive the request for EMM information from the client application, the EMM enabler application comprises an intermediary between the client application and the EMM system and wherein the EMM enabler application supports a plurality of different EMM systems, make an EMM-specific request for configuration information to the EMM system, receive the requested configuration information from the EMM system in response to the request, and provide, to the client application in response to the received request, the received configuration information from the EMM system.

The configuration information provided by the EMM enabler to the client can comprise login information for a service corresponding to the client application. The instructions executed by the processor of the client device can further causes the processor to access the service corresponding to the client application using the configuration information received from the EMM enabler application.

The request from the client application to the EMM enabler and the response provided from the EMM enabler application to the client application can be specific to the EMM enabler application and client application and not the EMM system. For example, making the EMM-specific requests for configuration information to the EMM system can comprises broadcasting the request to the EMM system, making an Application Program Interface (API) call to the EMM system, or issuing a query to the EMM system depending upon which EMM system of the plurality of EMM systems the request is made. Accordingly, receiving the requested configuration information from the EMM system can comprise receiving a broadcast from the EMM system, receiving an API response, or receiving a query response depending upon which EMM system of the plurality of EMM systems the request is made.

In some cases, the EMM enabler application can maintain the received configuration information. In such cases, the EMM enabler application can further receive a subsequent request for EMM information from a client application during a log in processes or the EMM system by the client application and respond to the subsequent request using the configuration data maintained by the EMM enabler application. Additionally, or alternatively, the EMM enabler application can provide one or more functions of a service corresponding to the client application.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed.

Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
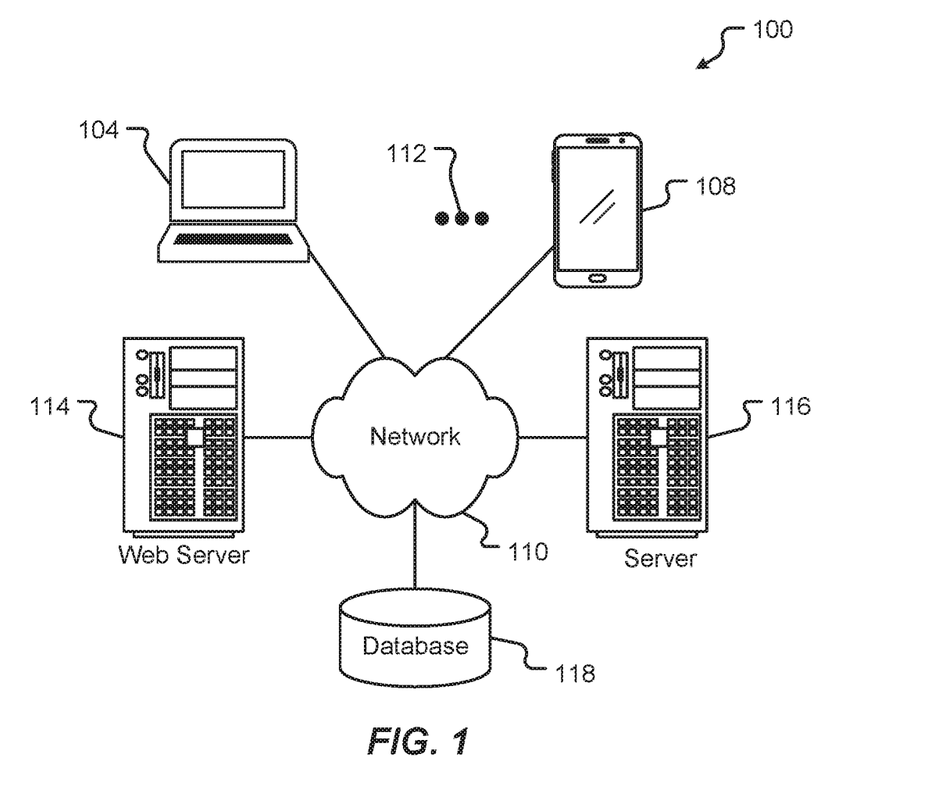
FIG. 1 is a block diagram illustrating elements of an exemplary computing environment in which embodiments of the present disclosure may be implemented.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
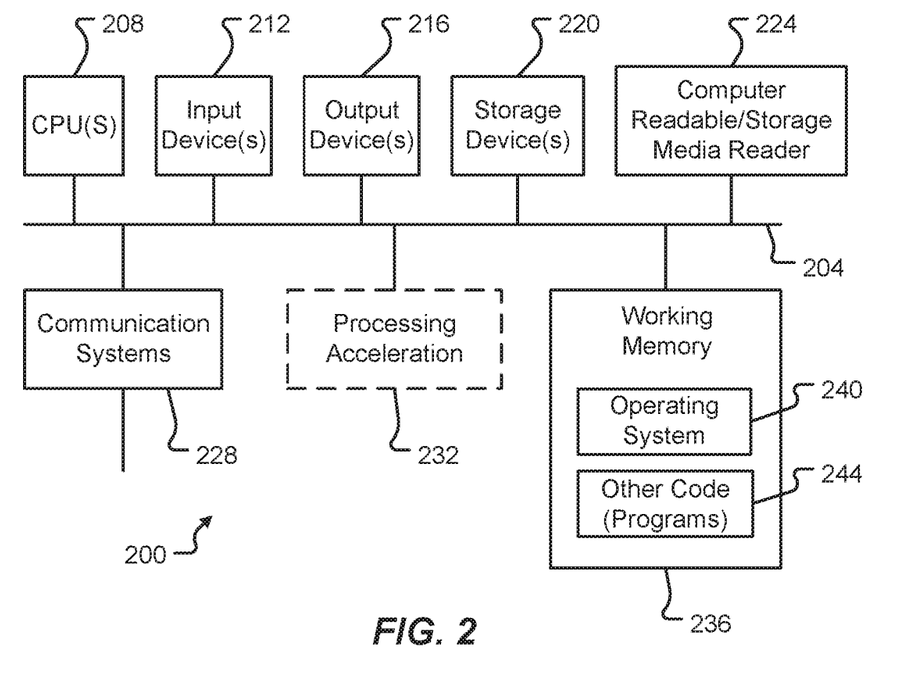
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
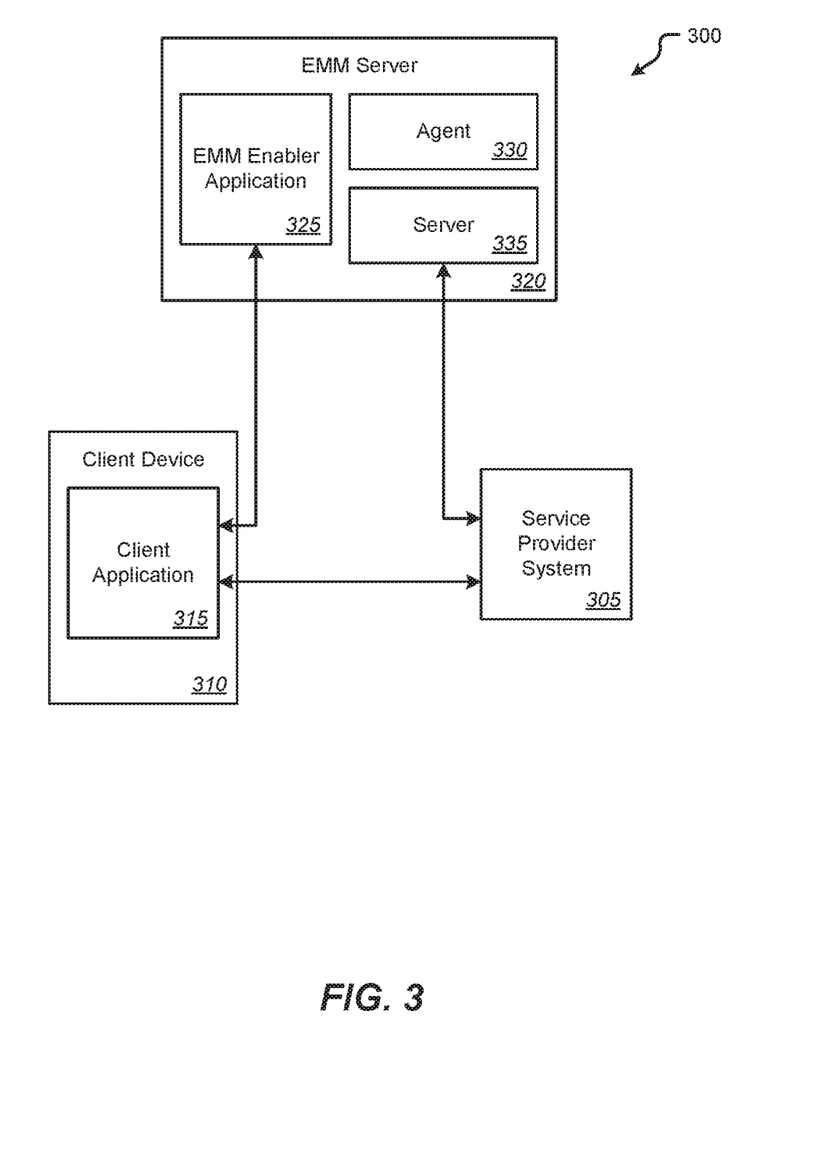
FIG. 3 is a block diagram illustrating elements of an exemplary environment for accessing EMM services according to one embodiment of the present disclosure.

FIG. 3 is a block diagram illustrating elements of an exemplary environment for accessing EMM services according to one embodiment of the present disclosure. As illustrated in this example, the system 300 can include a service provider system 305. The service provider system 305 can comprise any one or more servers and/or other computer systems as described above adapted to provide any of a variety of different services, e.g., Software-As-A-Service (SAAS) type services. For example, the service provider systems 305 can provide for remote, cloud-based backup and storage of files and/or other data. In some cases, the service provider systems 305 can provide a collaboration environment. Generally speaking, a collaboration environment can comprise a cloud-based virtual workspace in which the files or other data can be shared as work items among a group of users.

The system 300 can also include a client device 310 communicatively coupled with the service provider system 305 via one or more networks (not shown here) such as any of the networks described above and executing a client application 315. The client application 315 can comprise a client-side application, e.g., a mobile app, support by and providing access to functions of the services provided by the service provider system 305. For example, the client application 315 can comprise a synchronization client for cloud-based back-up and storage services of the service provider system 305. Additionally, or alternatively, the client application 315 can comprise a collaboration environment client for accessing and interacting with a collaboration environment provided by the service provider system 305.

Regardless of the exact nature of the client application 315, the vendor of the application, which may be the entity operating the service provider system 305, for example, can utilize the services of an EMM server 320 as known in the art. However, according to one embodiment, the EMM server 320 can execute an EMM enabler application 325. Generally speaking, the EMM enabler application 325 can comprise an intermediary between the client application 315 and the agent 330 of the EMM server 320. As an intermediary, the EMM enabler application 325 can interface with the agent 330 according to the defined interface for the EMM server 320 while providing an interface for the client application as defined by the vendor of that application. In this way, the EMM enabler application 325 need not change when the client application 315 changes. Additionally, the client application 315 need not change to be supported by different EMM servers which may have different interfaces. Thus, when the client application 315 is updated, it can be tested against the EMM enabler application 325 and does not need to be tested against different EMM servers 320.

In use, the client application 315 can request 505 EMM information from the EMM enabler application 325 during a log in processes of the EMM system by the client application. That is, the client application 315 can be adapted to make the request to the EMM enabler application 325, rather than the EMM agent 330. As noted, the request from the client application 315 to the EMM enabler application 325 can be specific to the EMM enabler application and client application and not the EMM system. According to one embodiment, data exchanged between the client application 315 and the EMM enabler application 325 may be encrypted. Additionally, or alternatively, the client application 315 and EMM enabler application 325 may exchange digital signatures or certificates to ensure communication with only trusted applications. In some cases, the EMM enabler application 325 may additionally, or alternatively, apply other security related restrictions. For example, the EMM enabler application 325 may apply one or more security policies to the client application 315, e.g., to require a certain minimum version number, and/or interactions between the client application 315 and EMM enabler application 325.

The EMM enabler application 325 can receive the request for EMM information from the client application 325 and make an EMM-specific request for configuration information to the EMM agent 330 of the EMM system 320. The request for configuration information can comprise a broadcast of the request to the EMM agent 330, Application Program Interface API call to the EMM agent 330, or a query to the EMM agent 330 depending upon the EMM system 320. The EMM agent 330 can respond to the request by retrieving or generating the appropriate configuration information for the client application 315 to use and provide the configuration information to the EMM enabler application in response to the request.

The EMM enabler application 325 can receive the requested configuration information from the EMM agent 330 and provide 535 the received configuration information to the client application 315 in response to the request received from the client application 315. The client application 315 can receive the requested configuration information from the EMM enabler application 325 in response to the request. The configuration can comprise login information which the client can then use to log on to the service provider system 305 and which the service provider system 305 can use to verify the user though the server 335 of the EMM service as known in the art.

To implement the EMM enabler application 325, the EMM server 320 maintains a separate virtual machine sandbox for the EMM enabler application 325 and manages additional inter-process communications, e.g., broadcasts, content providers, IPC bindings, etc., between the EMM enabler application 325 and client application 315. However, this additional overhead on the EMM server 320 is offset by eliminating, from the perspective of the client application 315, differences between different EMM servers 320 thereby simplifying maintenance of the client application 315. Similarly, testing of updates to the client application 315 can be faster since new builds do not need to be tested against different EMM servers 320. Furthermore, updates of the enabler application 325 are simplified because the enabler logic will rarely change so the administrators of the EMM servers 320 will likely only upload the enabler application 325 once or very infrequently. Users are then free to update the client application 315 themselves, e.g., from an application store or other source. These embodiments also reduce confusion and facilitate troubleshoot since there is only one version of the EMM enabler application 325 making it easier to track down issues users are experiencing.

Figure 4:
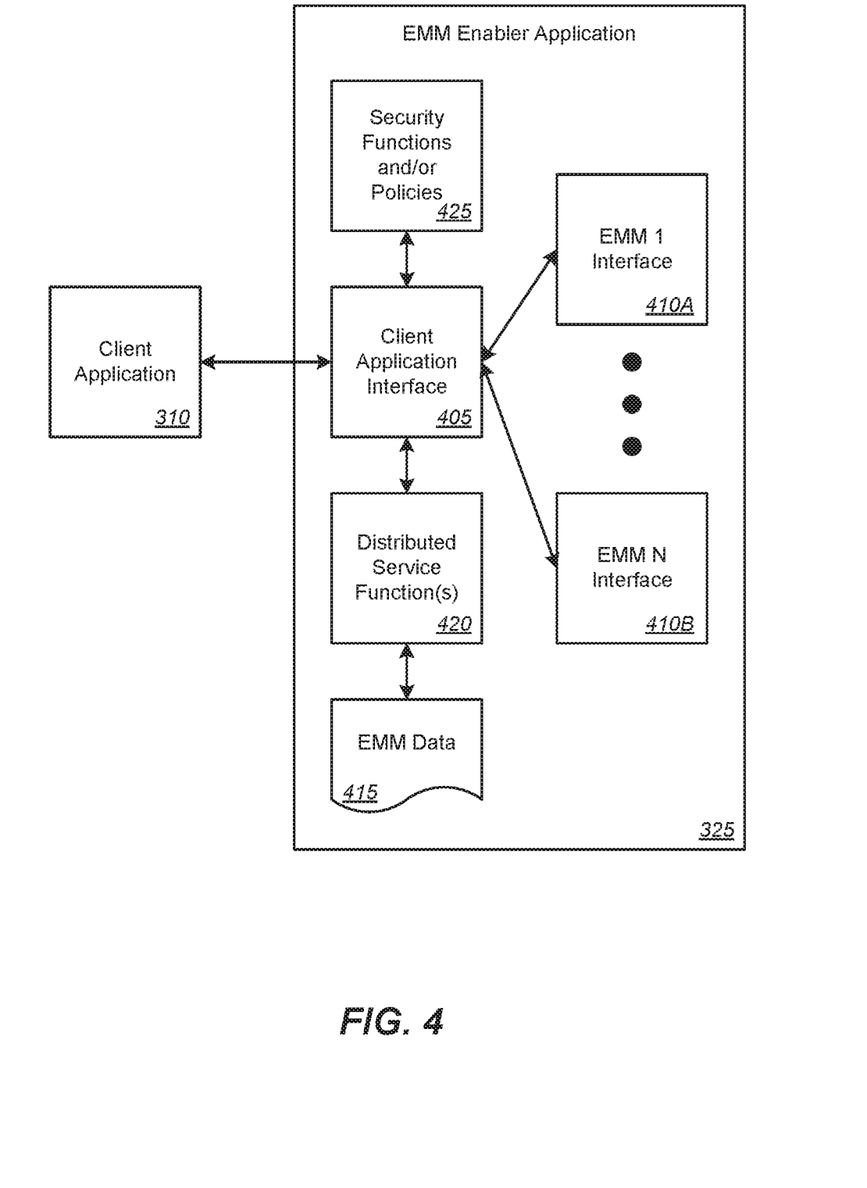
FIG. 4 is a block diagram illustrating addition details of an enabler application according to one embodiment of the present disclosure.

FIG. 4 is a block diagram illustrating addition details of an enabler application according to one embodiment of the present disclosure. As illustrated in this example, the EMM enabler application 325 can comprise a client application interface 405. The client application interface 405 can provide an interface that is specific to the client application 310 and regardless of any interface standard of any EMM service the EMM enabler application 325 may operate with. Instead, the EMM enabler application 325 provides a plurality of different EMM interfaces 410A-410B for each specific EMM service with which it may operate and performs any necessary conversions between the client application interface 405 and the EMM interfaces 410A-410B.

The EMM enabler application can also include and execute one or more distributed service functions 420. Generally speaking, the EMM enabler application 420 can maintain EMM data, e.g., configuration data for the client application 310 returned from the EMM service, and may use this information to support functions of the service corresponding to the client application 310 but which are performed by the EMM enabler application 325 rather than the service. For example, functions such as encryption, memory management, storage, etc. related to the services provided to the client application 310 can be performed by the EMM enabler application 325 rather than the service. Additionally, or alternatively, the EMM enabler application 325 can use the maintained EMM data 415 to process a subsequent request from the client application 310. For example, the maintained EMM data 415 can be used when the client application 310 logs out and later logs on again.

According to one embodiment, the EMM enabler application 325 can also include a set of security functions and/or policies 425. In some cases, the data exchanged between the client application 315 and the EMM enabler application 325 may be encrypted by the security functions and/or policies 425. Additionally, or alternatively, the security functions and/or policies 425 can cause the client application 315 and EMM enabler application 325 to exchange digital signatures or certificates and to verify these signatures to ensure communication with only trusted applications. In some cases, the security functions and/or policies 425 may additionally, or alternatively, apply other security related restrictions. For example, the security functions and/or policies 425 require a certain minimum version number, and/or interactions between the client application 315 and EMM enabler application 325. In such cases, the security functions and/or policies 425 may utilize parameters set by the administrator of the EMM server 320 which define minimum and maximum allowable version numbers. Additionally, or alternatively, the security functions and/or policies 425 can retain some information, such as a refresh token. In such cases, the client application 315 can query the enabler application 325 for the refresh token when the current access token expires. The security functions and/or policies 425 can also prohibit and/or control access for devices from which the client application 315 has been removed, when the device has been lost or stolen, when the user of the device has been removed from a group having access permission, e.g., an employee has been terminated or voluntarily leaves a company, etc.

Figure 5:
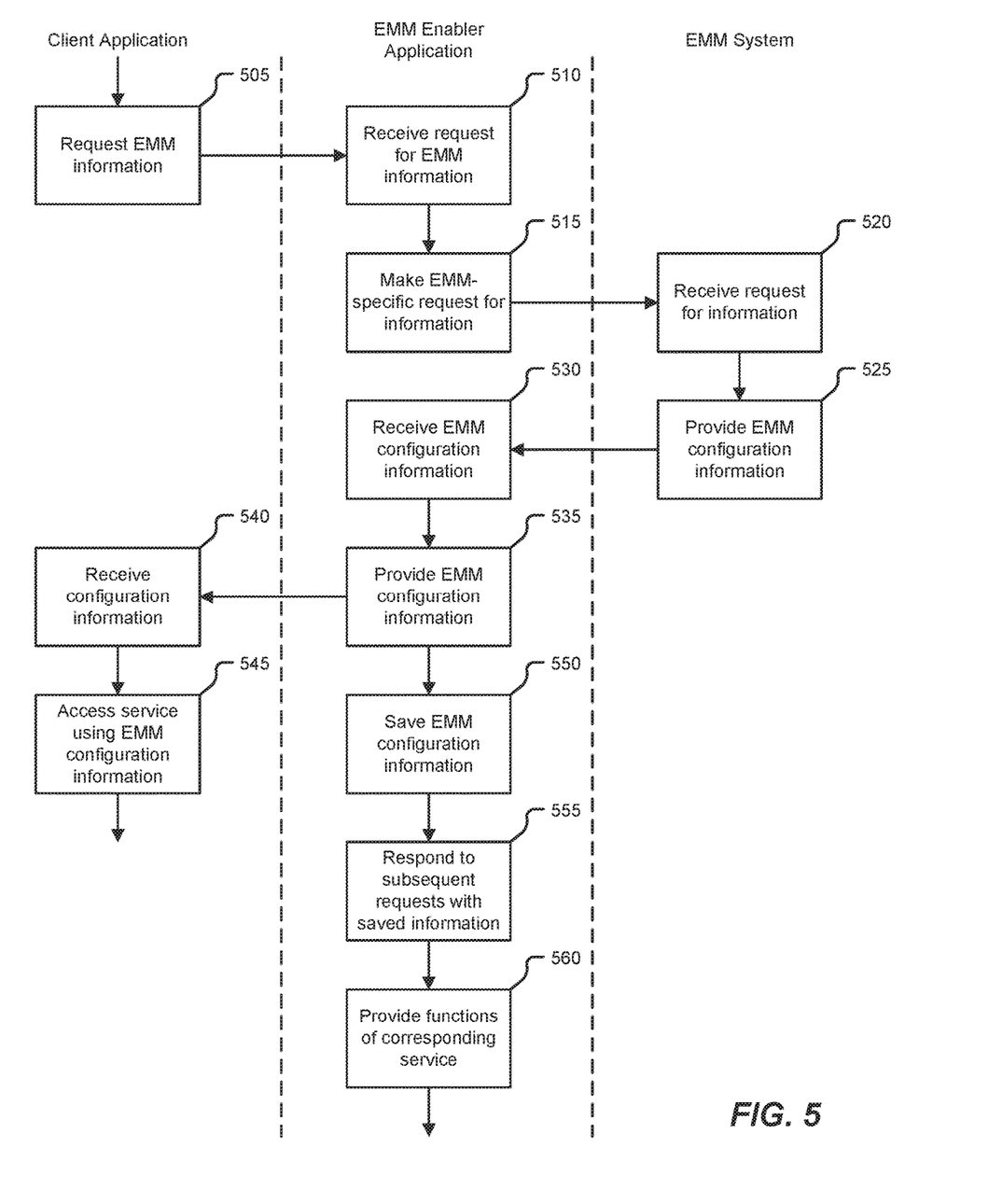
FIG. 5 is a flowchart illustrating an exemplary process for accessing an EMM service according to one embodiment of the present disclosure.

FIG. 5 is a flowchart illustrating an exemplary process for accessing an EMM service according to one embodiment of the present disclosure. As illustrated in this example, utilizing EMM services can begin with by a client application executing on a client device requesting 505 EMM information from an EMM enabler application during a log in processes or the EMM system by the client application. AS noted above, the EMM enabler application can comprise an intermediary between the client application and the EMM system and the EMM enabler application can support a plurality of different EMM systems. The client application can be adapted to make the request to the EMM enabler application, rather than the EMM service itself, and the request from the client application to the EMM enabler can be specific to the EMM enabler application and client application and not the EMM system.

The EMM enabler application executing on an EMM system can receive 510 the request for EMM information from the client application during a log in processes or the EMM system by the client application. As noted above, the EMM enabler application can comprise an intermediary between the client application and the EMM system and the EMM enabler application can support a plurality of different EMM systems. Furthermore, the request from the client application to the EMM enabler can be specific to the EMM enabler application and client application and not the EMM system. The EMM enabler application can make 515 an EMM-specific request for configuration information to the EMM system. Making 515 the EMM-specific requests for configuration information to the EMM system can comprise broadcasting the request to the EMM system, making an Application Program Interface (API) call to the EMM system, or issuing a query to the EMM system depending upon which EMM system of the request is made to and the interface that EMM system uses.

The EMM system can receive 520 the request from the EMM enabler application. This request is in the form and manner appropriate for the EMM system, regardless of the form of the original request from the client application. Therefore, the EMM system can respond to the request as it would any other request. Accordingly, the EMM system can retrieve or generate the appropriate configuration information for the client to use and provide 525 the configuration information to the EMM enabler in response to the request.

The EMM enabler application can receive the requested configuration information from the EMM system in response to the request. As noted above, the request from the EMM enabler application to the EMM system can comprise a broadcast of the request to the EMM system, an Application Program Interface (API) call to the EMM system, or a query to the EMM system depending upon which EMM system of the request is made to and the interface that EMM system uses. Accordingly, receiving 530 the requested configuration information from the EMM system can comprise receiving a broadcast from the EMM system, receiving an API response, or receiving a query response depending upon which EMM system of the plurality of EMM systems the request is made. The EMM enabler application can then provide 535 the received configuration information from the EMM system to the client application in response to the request received from the client. The response provided from the EMM enabler application to the client application can be specific to the EMM enabler application and client application and not the EMM system.

The client application can receive 540 the requested configuration information from the EMM enabler application in response to the request. The configuration information provided by the EMM enabler to the client can comprise login information for a service corresponding to the client application. The client application can then access 545 the service corresponding to the client application using the received configuration information from the EMM enabler application.

In some cases, the EMM enabler application can maintain 550 the received configuration information. In such cases, the EMM enabler application can receive a subsequent request for EMM information from a client application during a log in processes or the EMM system by the client application, e.g., the client application logs out of the service and later logs in again. In such cases, the EMM enabler application can respond 555 to the subsequent request using the configuration data maintained by the EMM enabler application. Additionally, or alternatively, the EMM enabler application can provide 560 one or more functions of a service corresponding to the client application, e.g., functions such as encryption, memory management, storage, etc. related to the services provided to the client application but performed by the EMM enabler application rather than the service.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for utilizing Enterprise Mobility Management (EMM) services, the method comprising:
    receiving, at an EMM enabler application executing on an EMM system, a request for EMM information from a client application during a log in processes of the EMM system by the client application, wherein the EMM enabler application comprises an intermediary between the client application and the EMM system, wherein the EMM system comprises one of a plurality of EMM systems, wherein each EMM system uses a different EMM interface, and wherein the EMM enabler application communicates with each EMM system using the different EMM interfaces;
    making, by the EMM enabler application, an EMM-specific request for configuration information to the EMM system;
    receiving, by the EMM enabler application, the requested configuration information from the EMM system in response to the request; and
    providing, by the EMM enabler, to the client application in response to the received request, the received configuration information from the EMM system.

2. The method of claim 1, wherein the configuration information provided by the EMM enabler application to the client comprises login information for a service corresponding to the client application.

3. The method of claim 1, wherein the request from the client application to the EMM enabler and the response provided from the EMM enabler application to the client application are specific to the EMM enabler application and client application and not the EMM system.

4. The method of claim 1, wherein making the EMM-specific requests for configuration information to the EMM system comprises broadcasting the request to the EMM system, making an Application Program Interface (API) call to the EMM system, or issuing a query to the EMM system depending upon the EMM interface of the EMM system of the plurality of EMM systems to which the request is made.

5. The method of claim 4, wherein receiving the requested configuration information from the EMM system comprises receiving a broadcast from the EMM system, receiving an API response, or receiving a query response depending upon the EMM interface of the EMM system of the plurality of EMM systems to which the request is made.

6. The method of claim 1, further comprising, maintaining, by the EMM enabler application, the received configuration information.

7. The method of claim 6, further comprising:
    receiving, by the EMM enabler application, a subsequent request for EMM information from a client application during a log in processes or the EMM system by the client application; and
    responding, by the EMM enabler application, to the subsequent request using the configuration data maintained by the EMM enabler application.

8. The method of claim 6, further comprising providing, by the EMM enabler application, one or more functions of a service corresponding to the client application.

9. A method for utilizing Enterprise Mobility Management (EMM) services, the method comprising:
    requesting, by a client application executing on a client device, EMM information from an EMM enabler application during a log in processes or the EMM system by the client application, wherein the EMM enabler application comprises an intermediary between the client application and the EMM system, wherein the EMM system comprises one of a plurality of EMM systems, wherein each EMM system uses a different EMM interface, wherein the EMM enabler application communicates with each EMM system using the different EMM interfaces, and wherein the request from the client application to the EMM enabler is specific to the EMM enabler application and client application and not the EMM interface of the EMM system;
    receiving, by the client application, the requested configuration information from the EMM enabler application in response to the request, wherein the response provided from the EMM enabler application to the client application is specific to the EMM enabler application and client application and not the EMM system.

10. The method of claim 9, wherein the configuration information provided by the EMM enabler application to the client comprises login information for a service corresponding to the client application.

11. The method of claim 10, further comprising accessing, by the client application, the service corresponding to the client application using the received configuration information from the EMM enabler application.

12. A system comprising:
    a client device comprising a processor and a memory coupled with and readable by the processor and storing therein a set of instructions which, when executed by the processor, causes the processor to request Enterprise Mobility Manager (EMM) information during a log in processes or the EMM system by the client application;
    a server comprising a processor and a memory coupled with and readable by the processor and storing therein a set of instructions which, when executed by the processor, causes the processor to execute an EMM enabler application, wherein the EMM enabler application:
        receives the request for EMM information from the client application, wherein the EMM enabler application comprises an intermediary between the client application and the EMM system, wherein the EMM system comprises one of a plurality of EMM systems, wherein each EMM system uses a different EMM interface, and wherein the EMM enabler application communicates with each EMM system using the different EMM interfaces,
        makes an EMM-specific request for configuration information to the EMM system,
        receives the requested configuration information from the EMM system in response to the request, and
        provides, to the client application in response to the received request, the received configuration information from the EMM system.

13. The system of claim 12, wherein the configuration information provided by the EMM enabler application to the client comprises login information for a service corresponding to the client application.

14. The system of claim 13, wherein the instructions executed by the processor of the client device, further causes the processor to access the service corresponding to the client application using the configuration information received from the EMM enabler application.

15. The system of claim 12, wherein the request from the client application to the EMM enabler application and the response provided from the EMM enabler application to the client application are specific to the EMM enabler application and client application and not the EMM system.

16. The system of claim 12, wherein making the EMM-specific requests for configuration information to the EMM system comprises broadcasting the request to the EMM system, making an Application Program Interface (API) call to the EMM system, or issuing a query to the EMM system depending upon the EMM interface of the EMM system of the plurality of EMM systems to which the request is made.

17. The system of claim 16, wherein receiving the requested configuration information from the EMM system comprises receiving a broadcast from the EMM system, receiving an API response, or receiving a query response depending upon the EMM interface of the EMM system of the plurality of EMM systems to which the request is made.

18. The system of claim 12, wherein the EMM enabler application further maintains the received configuration information.

19. The system of claim 18, wherein the EMM enabler application further:
  receives a subsequent request for EMM information from a client application during a log in processes or the EMM system by the client application; and
  responds to the subsequent request using the configuration data maintained by the EMM enabler application.

20. The system of claim 19, wherein the EMM enabler application further provides one or more functions of a service corresponding to the client application.

\* \* \* \* \*